United States Patent
Kochansky et al.

(10) Patent No.: US 7,778,909 B2
(45) Date of Patent: Aug. 17, 2010

(54) SYSTEM AND METHOD FOR UPDATING VALUATION DATA RELATING TO PASS-THROUGH SECURITIES

(75) Inventors: Joseph M. Kochansky, New York, NY (US); Kirk Snyder, Princeton Junction, NJ (US)

(73) Assignee: Blackrock Financial Management, Inc., New York, NY (US)

( * ) Notice: Subject to any disclaimer, the term of this patent is extended or adjusted under 35 U.S.C. 154(b) by 2299 days.

(21) Appl. No.: 10/325,052

(22) Filed: Dec. 20, 2002

(65) Prior Publication Data

US 2003/0187777 A1   Oct. 2, 2003

Related U.S. Application Data

(60) Provisional application No. 60/356,064, filed on Feb. 11, 2002.

(51) Int. Cl.
G06Q 40/00 (2006.01)
(52) U.S. Cl. .................................... 705/36 R
(58) Field of Classification Search .................. 705/35, 705/36 R, 36 T, 37, 38, 39, 40
See application file for complete search history.

(56) References Cited

U.S. PATENT DOCUMENTS

| | | | | |
|---|---|---|---|---|
| 5,193,056 A | | 3/1993 | Boes ........................... | 364/408 |
| 5,563,783 A | * | 10/1996 | Stolfo et al. ..................... | 705/8 |
| 5,761,442 A | | 6/1998 | Barr et al. ..................... | 395/236 |
| 5,774,880 A | | 6/1998 | Ginsberg | |
| 5,784,696 A | | 7/1998 | Melnikoff ..................... | 705/36 |
| 5,812,987 A | | 9/1998 | Luskin et al. ................. | 705/36 |
| 5,857,176 A | | 1/1999 | Ginsberg ..................... | 705/36 |
| 5,924,082 A | | 7/1999 | Silverman et al. | |
| 5,924,083 A | | 7/1999 | Silverman et al. | |
| 5,946,666 A | | 8/1999 | Nevo et al. ..................... | 705/36 |
| 5,946,667 A | | 8/1999 | Tull, Jr. et al. ................. | 705/36 |
| 5,950,176 A | | 9/1999 | Keiser et al. | |
| 5,991,743 A | | 11/1999 | Irving et al. ................... | 705/36 |
| 6,021,397 A | | 2/2000 | Jones et al. ................... | 705/36 |
| 6,055,517 A | | 4/2000 | Friend et al. .................. | 705/36 |
| 6,058,377 A | | 5/2000 | Traub et al. ................... | 705/36 |
| 6,061,662 A | | 5/2000 | Makivic ....................... | 705/36 |
| 6,078,904 A | | 6/2000 | Rebane ........................ | 705/36 |

(Continued)

OTHER PUBLICATIONS

Hodder, Leslie Davis (2001). Reliability and relevance of market risk disclosures by commercial banks. Ph.D. dissertation, The University of Texas at Austin, United States—Texas. Retrieved Jun. 3, 2010, from ABI/INFORM Global.(Publication No. AAT 3034549).*

Alles, L.. (1999). The word is securitisation. JASSA,(1), 27-31. Retrieved Jun. 3, 2010, from ABI/INFORM Global. (Document ID: 1978236111).*

(Continued)

*Primary Examiner*—Hani Kazimi
*Assistant Examiner*—Muriel Tinkler
(74) *Attorney, Agent, or Firm*—Edwards Angell Palmer & Dodge LLP (57) ABSTRACT

A system and method for updating and applying a financial outcome of transactions involving pass-through securities to portfolios associated with the transactions by updating valuation data associated with the pass-through securities found during a search of a trade database, computing a financial outcome of the transactions found based on the updated valuation data and applying the computed financial outcome to the portfolios of investments involved in the transactions.

15 Claims, 8 Drawing Sheets

U.S. PATENT DOCUMENTS

| | | | |
|---|---|---|---|
| 6,085,175 A | 7/2000 | Gugel et al. | 705/36 |
| 6,122,623 A | 9/2000 | Garman | 705/36 |
| 6,125,355 A | 9/2000 | Bekaert et al. | 705/36 |
| 6,185,543 B1 | 2/2001 | Galperin et al. | 705/38 |
| 6,249,775 B1 | 6/2001 | Freeman et al. | 705/36 |
| 6,292,787 B1 | 9/2001 | Scott et al. | 705/36 |
| 6,347,307 B1 | 2/2002 | Sandhu et al. | 705/35 |
| 6,456,982 B1 | 9/2002 | Pilipovic | 705/36 |
| 6,839,686 B1 * | 1/2005 | Galant | 705/36 R |

OTHER PUBLICATIONS

Robinson, Kenneth J, & Klemme, Kelly. (Aug. 1996). Does greater mortgage activity lead to greater interest rate risk? Evidence from bank holding companies. Financial Industry Studies,13. Retrieved Jun. 3, 2010, from ABI/INFORM Global. (Document ID: 10351259).*

Wright, David M, & Houpt, James V. (Feb. 1996). An analysis of commercial bank exposure to interest rate risk. Federal Reserve Bulletin, 82(2), 115. Retrieved Jun. 3, 2010, from ABI/INFORM Global. (Document ID: 9249003).*

* cited by examiner

Factor Update - Trades Affected

List of affected trades

| Affected Parameter | Fund | InvNum | TrdNum | Version | Tran Type | AssetID | Trade Date | Settle Date | Broker | Broker Desk | Orig F... |
|---|---|---|---|---|---|---|---|---|---|---|---|
| factor | ALEA-T | -1273 | 801 | 2 | TRD | 210805CQ8 | 09/27/2001 | 10/02/2001 | FBC | CORP | -200,C |
| factor | ARMS | -8820 | 4284 | 1 | TRD | 78442GCH7 | 10/10/2001 | 10/15/2001 | FBC | CORP | 6,500,C |
| coupon | BFK | -204 | 203 | 1 | TRD | 121342GF0 | 10/03/2001 | 10/03/2001 | LEH | STMUNI | -500,C |

| Affected Parameter | Fund | InvNum | TrdNum | Version | Tran Type | Coupon | | New Coupon Date | Coupon Locked? | Post Correction? Select All |
|---|---|---|---|---|---|---|---|---|---|---|
| | | | | | | Current | New | | | |
| factor | AHR | -24126 | 1464 | 2 | ALLC | 5.500000000 | 5.500000000 | 09/01/2001 | unlocked | |
| factor | AHR | -24108 | 1464 | 2 | ALLC | 5.500000000 | 5.500000000 | 09/01/2001 | unlocked | |
| factor | AHR | -24104 | 1464 | 2 | ALLC | 5.500000000 | 5.500000000 | 09/01/2001 | unlocked | |
| factor | AHR | -24105 | 1464 | 2 | ALLC | 5.500000000 | 5.500000000 | 09/01/2001 | unlocked | |
| factor | ALEA-T | -1273 | 801 | 2 | TRD | 6.545000000 | 6.545000000 | 08/02/2001 | unlocked | ☐ |
| COUPON | BFK | -204 | 203 | 1 | TRD | 2.300000000 | 1.750000000 | 10/03/2001 | unlocked | ☐ |
| COUPON | BFK | -205 | 204 | 1 | TRD | 1.750000000 | 2.350000000 | 10/04/2001 | unlocked | ☐ |
| COUPON | BFK | -215 | 214 | 1 | TRD | 2.150000000 | 2.050000000 | 10/05/2001 | unlocked | |

# SYSTEM AND METHOD FOR UPDATING VALUATION DATA RELATING TO PASS-THROUGH SECURITIES

CROSS-REFERENCE TO RELATED APPLICATIONS

The subject application claims priority to commonly owned, U.S. Provisional Application Ser. No. 60/356,064, filed Feb. 11, 2002, the disclosure of which is herein incorporated by reference in its entirety.

BACKGROUND OF THE INVENTION

1. Field of the Invention

The subject disclosure is directed to a system and method for updating valuation data necessary for determining the present worth of financial instruments, and more particularly, to a system and method for updating time-sensitive valuation data associated with pass-through securities, computing the financial outcome of transactions involving the pass-through securities and investors' portfolios and applying the computed financial outcome to the portfolios involved in the transactions.

2. Background of the Related Art

A pass-through security is a financial instrument which represents pooled debt obligations and passes income from debtors to its shareholders. The most common type is the mortgage-backed security, which represents an ownership interest in mortgage loans made by financial institutions to finance the borrower's purchase of a home or other real estate. Mortgage securities are created when these loans are pooled and "securitized" for sale to investors by agencies or corporations such as the Government National Mortgage Association (GNMA or Ginnie Mae) and Federal Home Loan Mortgage Corporation (FHLMC or Freddie Mac). Investors may purchase mortgage-backed securities from the issuer, when dealt in the secondary market, or from dealers in the open market, such as the Federal National Mortgage Association (FNMA or Fannie Mae).

As the underlying mortgage loans are paid off by the homeowners, the investors receive payments of interest and principal. Mortgage-backed securities provide a pass-through coupon rate, but repayment of the principal is given in increments over the life of the security, as the underlying mortgage loans are paid off, rather than in a single lump sum at maturity. Mortgage-backed securities may pay interest and principal monthly, quarterly or semiannually, depending on the structure and terms of the issue. Typically, the timing and speed of principal repayments vary, because the cash flow on mortgage-backed securities is also irregular.

For example, if homeowners whose mortgages are in a pool sell their homes, refinance their loans to take advantage of lower interest rates, prepay their mortgages for some other reason or default on their loans, the principal is distributed on a pro rata basis to the investors. When this happens, the investors' remaining interest in the pool is reduced by the amount of prepayments. Since the principal is reduced over the life of the security, the interest income decreases in terms of absolute dollars paid to investors. Thus, the pass through coupon rate of interest changes.

Mortgage-backed securities are sold and traded in terms of their assumed average life rather than their maturity dates, in part because of the aforementioned irregularities. The prepayment speed, which is the average rate at which mortgage holders are expected to pay off their loans ahead of schedule, is used in calculating the value of mortgage backed security. However, some mortgage loans could remain outstanding for the entire life of the original loans, which is typically thirty years.

To facilitate the determination of the prepayment speed (and in turn, the buying and selling prices), a decimal value known as the remaining principal balance (RPB) factor is utilized. The RPB factor (also known as the "pool" or "pay down" factor) reflects the proportion of the outstanding principal balance of a mortgage-backed security, which changes over time, in relation to its original principal value. Certain institutions publish monthly factor reports containing a list of factors for Ginnie Mae, Fannie Mae and Freddie Mac mortgage-backed securities, among others. The remaining principal balance (RPB) is the basis for calculation of the purchase price of the securities.

The investors in the mortgage-backed security market are typically large institutions handling an extensive number of portfolios, each portfolio including a variety of amounts and types of mortgage-backed securities. These securities are often traded, sold or bought (hereinafter collectively referred to as "trades" or "transactions"). Each of these transactions must be evaluated to determine the net losses or gains to apply to the associated portfolio. Typically, the daily volume of transactions involving such securities is extremely high, making it cumbersome if not impossible to calculate the net losses of gains by hand. The procedure is further complicated by possible fluctuations of the pass through coupon rate (also referred to hereinafter as simply "coupon") and RPB factor (also referred to hereinafter as simply "factor") which must be updated prior to evaluating these transactions.

It would be beneficial therefore, to provide a system and method for automatically tracking trades involving pass-through securities, such as mortgage-backed securities, and updating factors and coupons for the corresponding pass-through securities, as needed, in a convenient, efficient and effective manner.

SUMMARY OF THE DISCLOSURE

The present invention provides a system and method for updating a financial outcome of transactions involving pass-through securities. In one embodiment, a method in accordance with the present invention, includes the steps of: searching a trade database for transactions involving pass-through securities having a computable present worth based on time-sensitive valuation data; updating valuation data associated with pass-through securities found during the search of the trade database; and computing a financial outcome of the transaction involving the pass-through found during the search of the trade database based on the updated valuation data.

The aforementioned method may further include the step of applying computed financial outcomes to portfolios of investments involved in the transactions found. A method in accordance with the present invention may also include the step of displaying the transactions found and computed financial outcomes on a graphical interface, and furthermore, selecting the computed financial outcomes to apply to the associated portfolios. The aforementioned embodiment of a method in accordance with the present invention may require user authorization prior to displaying the transactions found and computed financial outcomes based on the updated valuation data on a graphical interface.

The updating valuation data step of a method in accordance with the present invention may further include updating valuation data relating to the remaining principal balance and/or the rate of interest associated with the pass-through securities found during the search of the trade database, such as remaining principal balance factors and pass-through coupons.

The searching through the trade database for transactions involving pass-through securities may be limited in scope by selecting parameters relating to the transactions, such as for example, settlement dates, portfolios, or pass-through securities.

The method of the present invention may further include the step of searching a valuation data database for valuation data.

As mentioned above, the present invention is also directed to a system for updating a financial outcome of transactions involving pass-through securities. In one embodiment, a system in accordance with the present invention includes a trade database for storing data relating to transactions involving pass-through securities, a device for searching the trade database for transactions involving pass-through securities having a computable present worth based on time-sensitive valuation data, a device for updating the valuation data associated with pass-through securities found during the search of the trade database, and a device for computing the financial outcomes of the transactions found based on the updated valuation data.

The valuation data may include data relating to the remaining principal balance and or rate of interest associated with the pass-through securities involved in the transactions found in the trade database, such as remaining principal balance factors and pass-through coupons. The system of the present invention may also include a valuation database for storing current valuation data, and a device for searching the valuation database for valuation data associated with the pass-through securities involved in the transactions found by the system.

The aforementioned system may also include a portfolio database for storing data relating to portfolios of investments including pass-through securities and a device for applying computed financial outcomes to portfolios in the portfolio database associated with the transactions found.

In one embodiment of a system constructed in accordance with the present invention, the devices for searching the various databases can be search engines with graphical user interfaces permitting user-specification of search parameters.

In another embodiment of a system constructed in accordance with the present invention, a graphical user interface is provided for displaying the transactions found and computed financial outcomes. The system may further include a device for selecting the computed financial outcomes to apply to associated portfolios in a portfolio database. Furthermore, the system may include a device for restricting unauthorized users from selecting the computed financial outcomes to apply.

The present invention is also directed to a machine readable media for updating and applying a financial outcome of transactions to the portfolio associated with each transaction. The media includes data segments for storing data relating to portfolios of investments in a portfolio database, storing data relating to a transactions involving portfolios in the portfolio database and pass-through securities having a computable present worth based on time-sensitive valuation data in a trade database. The media also includes code segments for searching the trade database for transactions involving pass-through securities, updating valuation data associated with the pass-through securities found during the search of the trade database, computing the financial outcomes of the transactions found based on the updated valuation data, and applying the computed financial outcomes to portfolios associated with the transactions found.

These and other aspects of the system and method of the subject invention will become more readily apparent to those having ordinary skill in the art from the following detailed description of the invention taken in conjunction with the drawings.

BRIEF DESCRIPTION OF THE FIGURES

So that those having ordinary skill in the art to which the present invention pertains will more readily understand how to make and use the method and system of the present disclosure, embodiments thereof will be described in detail herein below with reference to the drawings, wherein.

DETAILED DESCRIPTION OF THE PREFERRED EMBODIMENTS

The subject disclosure is directed to a new and useful tool for updating data, namely the aforementioned factors and coupons, relating to certain financial instruments in the form of a computerized system preferably integrated with an analytical system having an analytical engine configured to provide intra-day and inter-day real-time relative value analyses, credit risk analyses, and value at risk analyses, and a trading system configured to execute trades and the terms of the agreements governing the collateral provided for multiple portfolios of diverse fixed income securities and derivatives. For purposes of illustrating the features of the present invention, the embodiment discussed herein is intended to be operated by a corporate entity, partnership or person that engages in transactions involving financial instruments with a counter party, which may be another corporate entity, partnership or person.

It should be understood that incorporating the present disclosure in an integrated system as described above is exemplary of the type of setting for which a system and method in accordance with the present disclosure is well-suited. Those skilled in the art will readily appreciate that a system and method in accordance with the present disclosure may be used in conjunction with other settings as well. Furthermore, it should be understood that a system and method in accordance with the present invention may be used to provide updated data other than factors and coupons.

Those skilled in the art will also readily appreciate that a system in accordance with the present disclosure includes the various computer and network related software and hardware that may be used in a distributed computing network, that is, programs, operating systems, memory storage devices, input/output devices, data processors, servers with links to data communication systems, wireless or otherwise, such as those which take the form of a local or wide area network, and a plurality of data transceiving terminals within the network, such as personal computers. Those skilled in the art will further appreciate that, so long as its users are provided with access to a system and method constructed in accordance with the present disclosure, the type of network, software or hardware is not vital to its full implementation.

Figure 1:
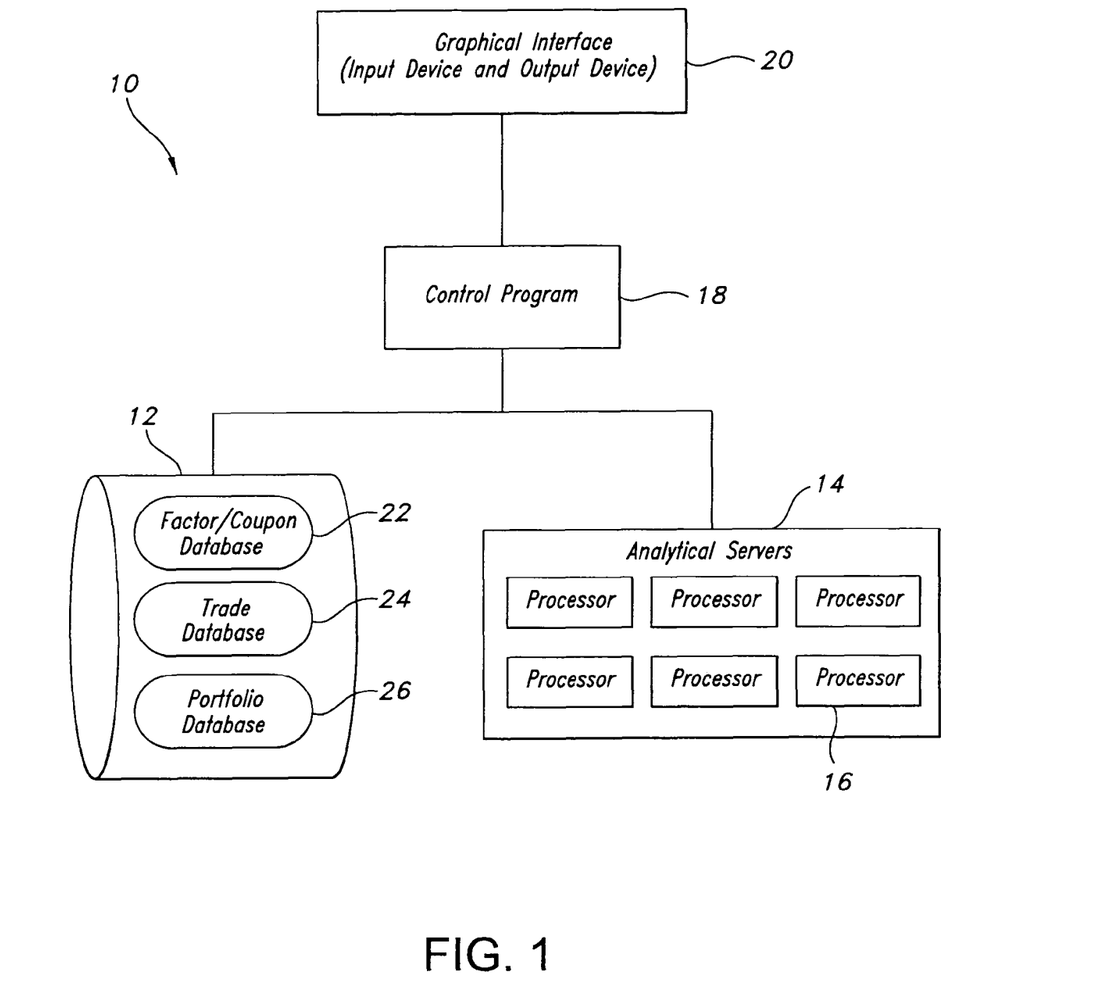
FIG. 1 is a schematic diagram depicting the core functional components of the computer-based factor and coupon update system of the present invention.

Referring now to the drawings wherein there is a schematic representation illustrated in FIG. 1 of the core functional components of a collateral management system constructed in accordance with the subject disclosure designated generally by reference numeral 10. It should be understood that system 10 is adapted and configured to function independently while also interacting with other systems such as systems for performing market analysis and the trading of financial instruments, including trading systems capable of actualizing trades of financial instruments via the world wide web. In particular, system 10 provides, preferably through graphical user interfaces, a factor and coupon update tool for periodic or upon demand updates of portfolios of financial instruments, namely pass-through securities (referred to hereinafter as just "securities").

Preferably, the graphical user interfaces (also referred to herein as "screens") used by system 10 incorporate user-friendly features and fit seamlessly with other operating system interfaces, that is, in a framed form having borders, multiple folders, toolbars with pull-down menus, embedded links to other screens and various other selectable features associated with animated graphical representations of depressible buttons. These features can be selected (i.e., "clicked on") by the user via connected mouse, keyboard, voice command or other commonly used tool for indicating a preference in a computerized graphical interface.

System 10 includes a data storage device or memory 12 and an analytical server 14 having a processor 16 which is operatively associated with the memory 12 via control program 18 for managing the flow of data throughput. Alternatively, and as shown in the embodiment of the present invention depicted in FIG. 1, a plurality of analytical servers 14 and processors 16 may be associated with memory 12 and control program 18 to operate system 10. Data input and output devices 20, collectively referred to herein as a graphical interface, are operatively associated with the memory 12 and server 14 for performing functions through control program 18, such as receiving and reporting data in accordance with the present invention. Program 18 contains an instruction set written in a conventional computing language such as HTML, C++ or Java, for coordinating the interactive relationship between memory 12, processors 16, and graphical interface 20.

Memory 12 may contain a plurality of cooperative relational databases. For example, this embodiment has a factor/coupon database 22 for storing data relating to factor/coupon updates, a trade database 24 for storing information relating to transactions of securities and a portfolio database 26 for storing information relating to the portfolios of securities. The databases may also be shared by the integrated analytical and trading systems.

Figure 2:
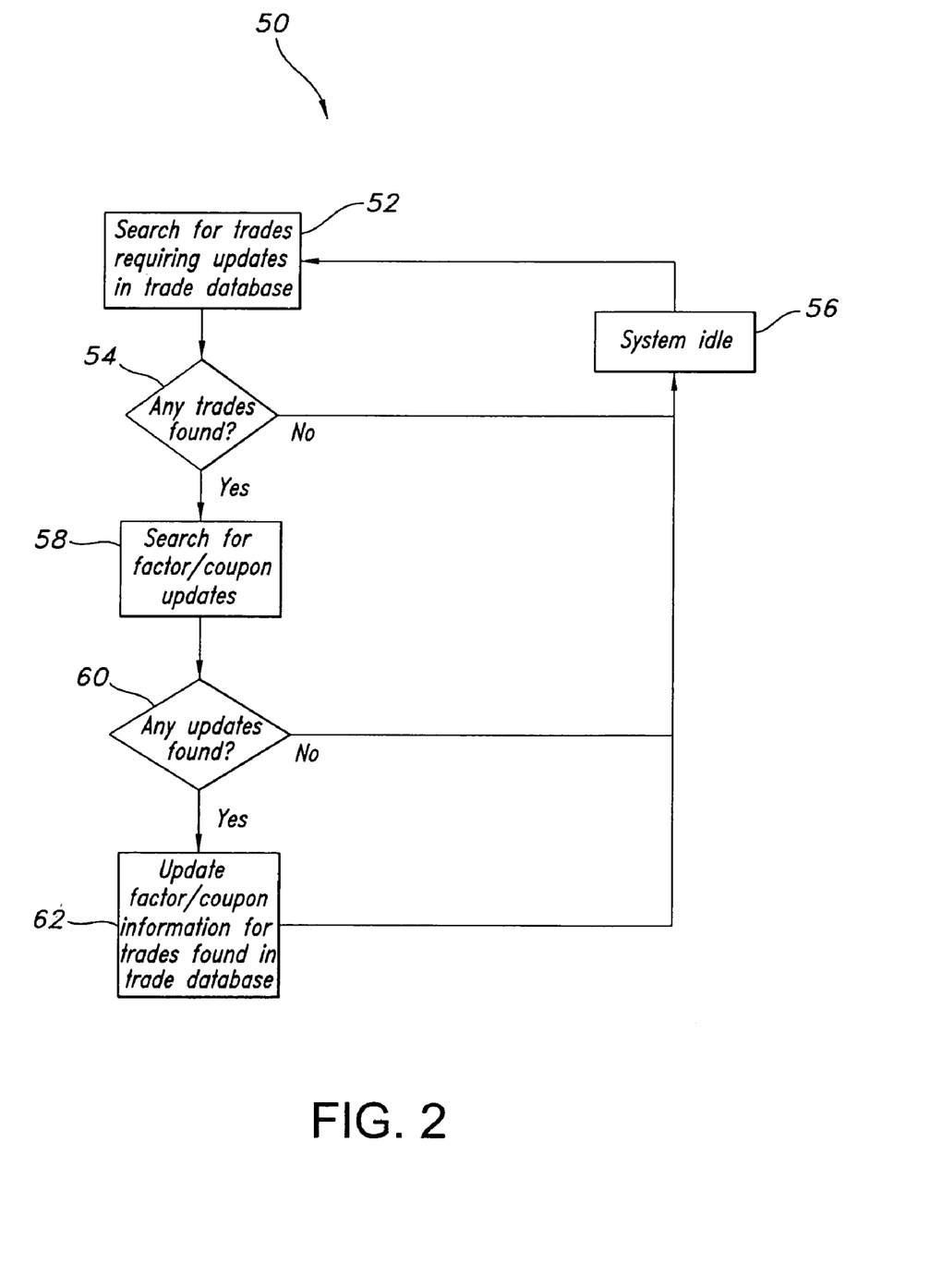
FIG. 2 is a flow chart depicting the operational steps employed by a system and method in accordance with the present invention.

Referring now to FIG. 2, there is illustrated a process flow chart 50 depicting operational steps employed in a first embodiment of a system and method in accordance with the present invention wherein a factor and coupon update tool is employed as a fully integrated component in a system having trading and analytical capabilities.

Generally, process 50 is actuated as part of an automated routine or by a user through graphical interface 20. At step 52, server 14, processor 16 and control program 18 operatively cooperate to perform a search in trade database 24 for any trades involving securities that require factor and/or coupon updates. If no such trades are found in step 56, then system 10 proceeds to step 56 and idles until further initiation. After reaching step 56, the process 50 returns to searching the trade database at step 52 when actuated again. Preferably, if process 50 was initiated by a user, then a message indicating that no trades were found is communicated through graphical interface 20. If process 50 was actuated as an automated routine, then preferably a summary of the results is stored as an activity log in a database, such as trade database 24.

Returning to the inquiry in step 54, when one or more trades involving securities which may require updated factor or coupon information are discovered in trade database 24, then system 10 will conduct a search for the latest factor and/or coupon update data in step 58. This data may be stored in database 22. Database 22 may receive and store information from a variety of sources, including the issuer of the financial instrument, or it may be the same database utilized by the analytical components within the integrated system. Alternatively, system 10 may be linked via the World Wide Web or otherwise to a site or sites which provide such updated coupon or factor data.

As shown in inquiry step 60, if system 10 does not locate updated factor or coupon data relating to the securities involved in the trade or trades found, then system 10 proceeds to step 56 where it idles until being actuated thereafter. If system 10 locates updated factor or coupon data for the securities involved in any of the trades found, then system 10 proceeds from step 60 to step 62 where the old information is replaced by the update and stored in trade database 24. Preferably, the date of the update is also recorded. System 10 will then proceed to step 56 and idle until returning to step 52 upon being actuated thereafter.

Figure 3:
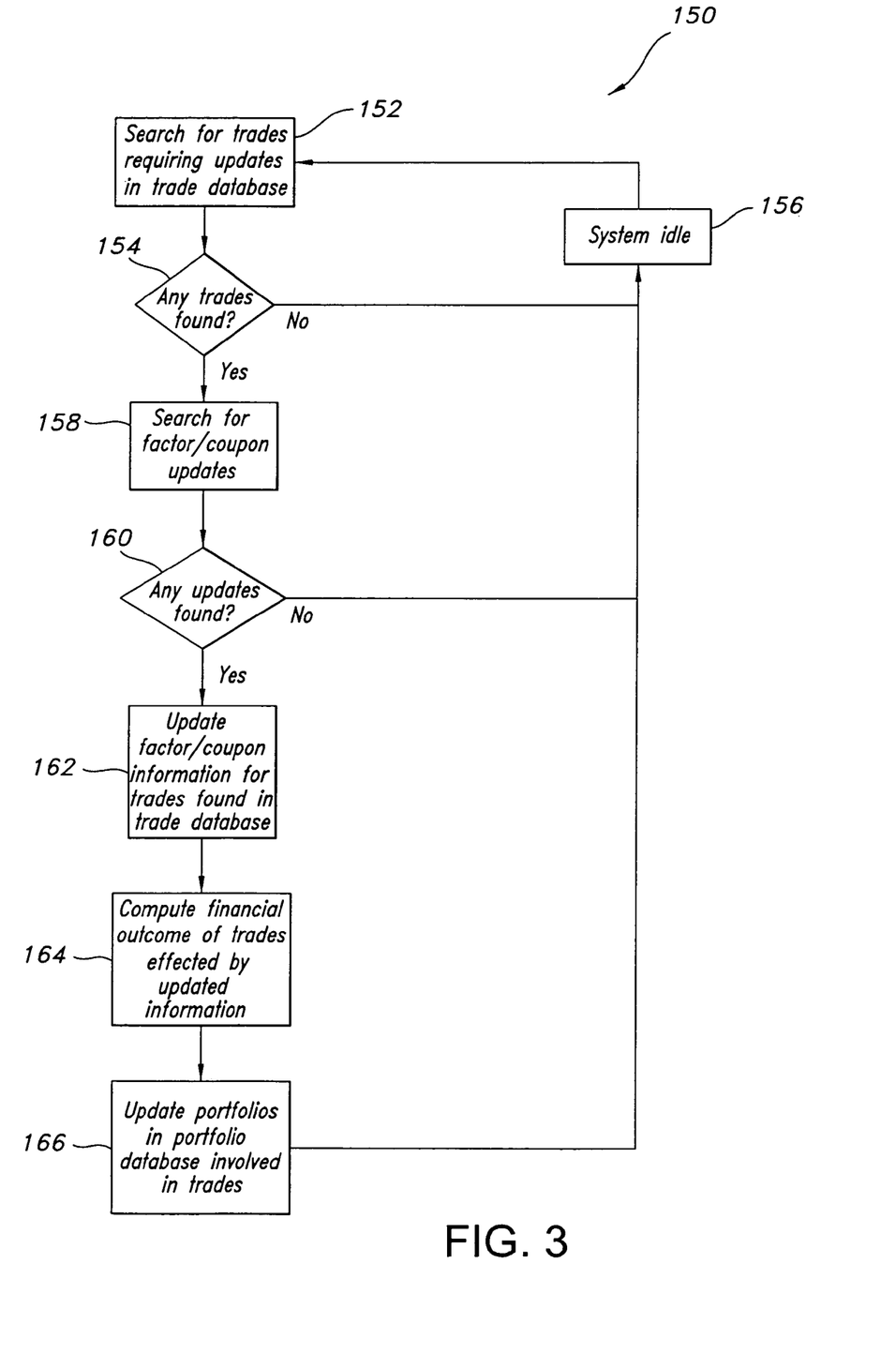
FIG. 3 is a flow chart illustrating the operational steps employed by a system and method in accordance with another embodiment of the present invention.

In the embodiment of the present invention shown in FIG. 3, system 10 is configured to conduct a process 150 which, in addition to the process steps of the previous embodiment, includes performing computations to determine, among other things, the net gain or loss from each of the transactions which received updated information. Thus, if process 150 reaches step 162 and updates the factor and/or coupon information for each trade found, then the financial outcome of the updated trades will be determined in step 164. System 10 components, such as server 14, processor 16 and program 18, cooperate to obtain any necessary data and perform the computation of step 164 which may also include utilizing the integrated analytical system associated with system 10.

The current value of a financial instrument subject to a factor update may be obtained by multiplying the original face value by the most recent factor. A formula for calculating the capital gain or loss from a particular trade involving a financial instrument subject to a factor update is shown below:

$$\text{Proceeds(excluding commission)} = [\text{Original face value}] \times [\text{factor}] \times [\text{market price} / 100] + [\text{accrued interest}]$$

For example, assume $1,000,000 worth of BFK was sold for Portfolio A, the newly updated factor is 0.9941970 and there is no accrued interest owed. If the market price as determined on the secondary market for this $1,000,000 block of BFK is $97.75, substituting the numbers in the above formula yields the following:

$$= \$1{,}000{,}000 \times 0.9941970 \times \$97.75 / 100 + 0$$
$$= \$971{,}827.57$$

The above example illustrates a sale of BFK at a discount, which provides Portfolio A with a capital loss position. If the market price was $102.35 instead of $97.75, the sale of BFK would be at a premium ($1,017,560.63) and Portfolio A would realize a capital gain. In step 166, the portfolio in portfolio database 26 involved in the transaction associated with the updated information is also updated in accordance with the outcome of the computation performed in step 164.

In the case of a coupon update, the updated coupon interest rate can be multiplied by the par or face value of the instrument to determine the amount of income owed to the portfolio in database 26 which owns the instrument. In step 166, this portfolio is also updated in accordance with the outcome of the computation performed in step 164.

Figure 4:
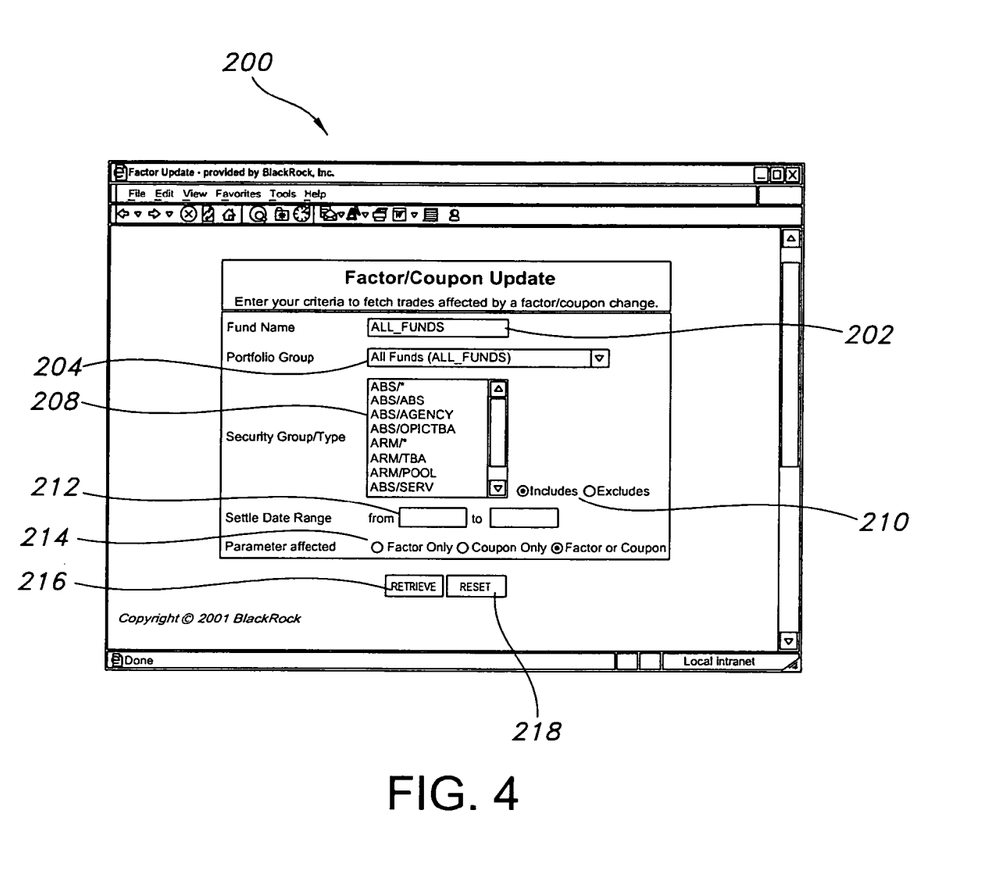
FIG. 4 illustrates an exemplary graphical user interface providing a tool for specifying search parameters, wherein the inputted data is used to conduct a search for in the system databases in accordance with the present invention.

FIG. 4 illustrates a screen 200 that may be used to actuate a search of trades in database 22 for trades that need factor or coupon updating. Screen 200 includes various adjustable parameters and options for facilitating convenient and time efficient operation of a method and system constructed in accordance with the present invention. Screen 200 contains a field 202 for inputting an identifier for a fund, fund type, or grouping of funds, to limit the results of the query in trade database 22 to show trades which involve only those funds corresponding to the identifier. The default entry in field 202 is "ALL_FUNDS" as shown in FIG. 4, which, as the name suggests, substantially includes all funds that could be traded.

Figure 5:
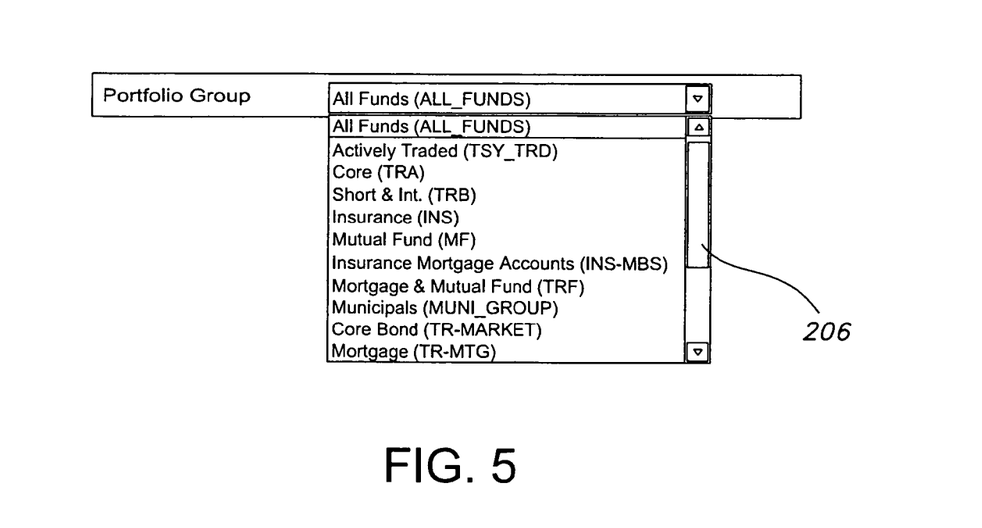
FIG. 5 illustrates a portion of the exemplary graphical user interface of FIG. 4 which shows a portion of the available options for searching by portfolio group.

The portfolio group field 204 permits the user to limit the scope of the search to the input identifier, which includes groupings and fund types such as those listed in the drop-down menu 206 shown in FIG. 5. The default entry in field 204 is "All Funds (ALL_FUNDS)" as shown in FIGS. 4 and 5, which substantially includes all portfolios in portfolio database 26.

A specific security group or type may be selected in field 208 to narrow the search results to only those identified in field 208. Security groups or types may be highlighted in field 208 and included or excluded in the subsequent search by indicating the desired choice in the include and exclude option bar 210. Thus, if a certain security group or type is highlighted and the include option in bar 210 is also selected, system 10 will then focus the search on trades in database 24 to update that involve only those security groups or types. Alternatively, the exclude option in bar 210 can be used to single out highlighted security groups or types so that system 10 does not spend excess time and resources searching through all trades in database 24. The default setting in option bar 210 is include, which will either direct system 10 to search for trades involving the security groups highlighted in field 208, or direct system 10 to search for all trades of the security groups and types if none are highlighted in field 208.

The search may also be directed to trades that settled within a specified date range by entering the period of time sought in fields 212 (which includes both "from" and "to" input fields shown in screen 200). The default is no entry, that is, no time restrictions on the search. The parameter affected (i.e., factor only, coupon only, or factor or coupon) may be selected in option bar 214 to further focus the search in accordance with the selected parameter. The default option in bar 214 is factor or coupon, which results in a search for trades that need factor updates, coupon updates, or factor and coupon updates. Once the search criteria have been specified, the retrieve button 216 may be pressed to begin the search. Alternatively, the criteria may be returned to the default values by pressing reset button 218.

Figure 6:
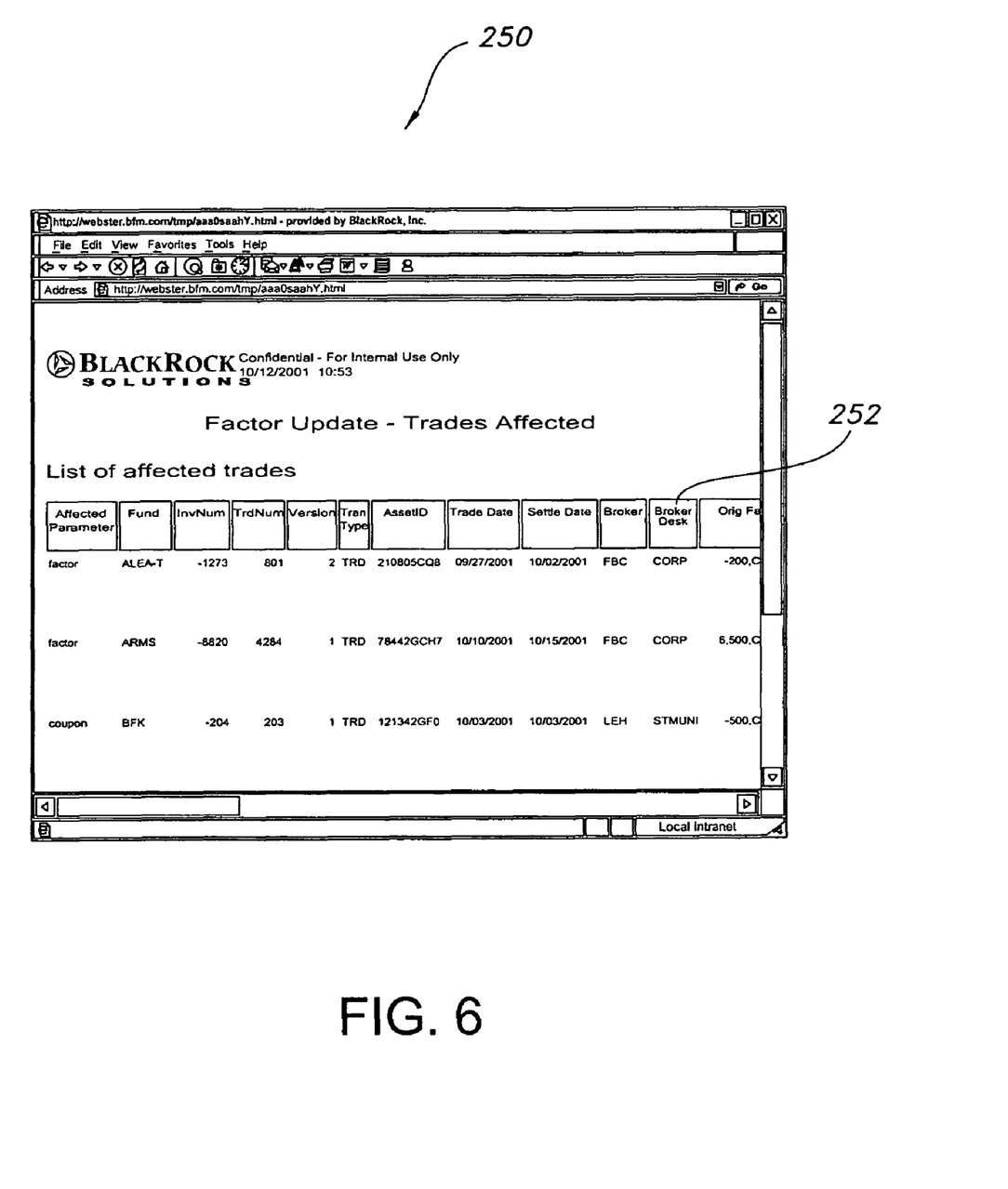
FIG. 6 illustrates an exemplary graphical user interface providing a tool primarily for displaying and confirming the results of the search conducted using the graphical user interface of FIG. 4, wherein the results are displayed in a results table.

FIGS. 6 through 9 illustrate screens that were generated as a result of an exemplary search which was directed through screen 200 and conducted in databases 22, 24 and 26, as needed, in accordance with the present system. Screen 250 in FIG. 6 shows the results of a search in which all specified criteria in screen 200 were left at the default settings except for the settle date range field 212. The settle date range field 212 was set to search trade database 24 for trades which settled from Oct. 1, 2001 to Oct. 15, 2001. Thus, the search in trade database 24 covered trades involving all funds identified by field 202, all portfolio groups identified by field 204, all security groups and types shown in field 208 from Oct. 1, 2001 to Oct. 15, 2001 which may require either factor or coupon updates or both.

Screen 250 includes a truncated portion of a table 252 which contains information retrieved from the search. As shown in the "settle date" column of table 252, the listed trades have settlement dates between the specified date range. The affected parameter which requires an update is also specified for each trade found in table 252, as well as other information about the trade including, for example, the fund name, invoice number, trade number, version, transaction type, asset ID, CUSIP number, trade date, broker, broker desk and original face value of the fund, among other things, such as data used with or relating to the integrated analytical and trading systems. Table 252 also includes the newly computed values, such as the net money lost or gained from the trades found, based on the updated information obtained from factor/coupon update database 22 or otherwise.

Figure 7:
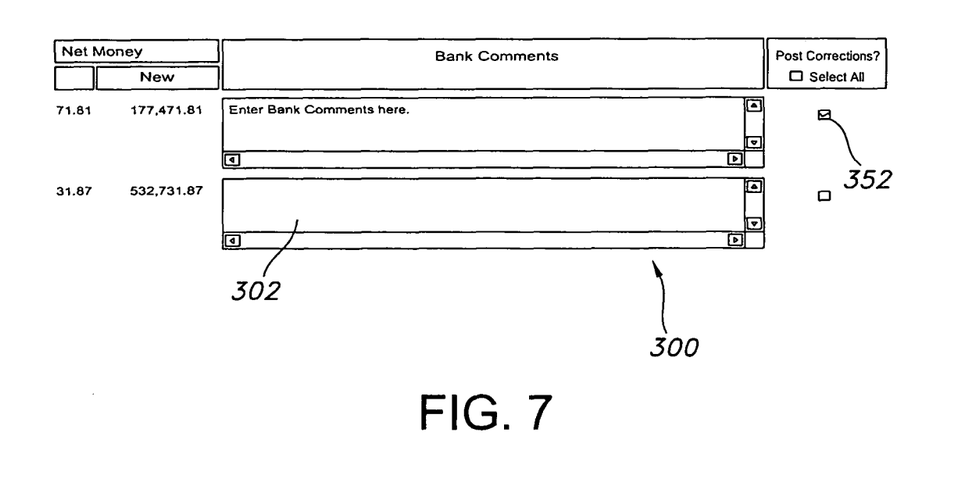
FIG. 7 illustrates a portion of the results table of FIG. 6, but not shown in FIG. 6, providing locations used primarily for inputting information.
Figure 8:
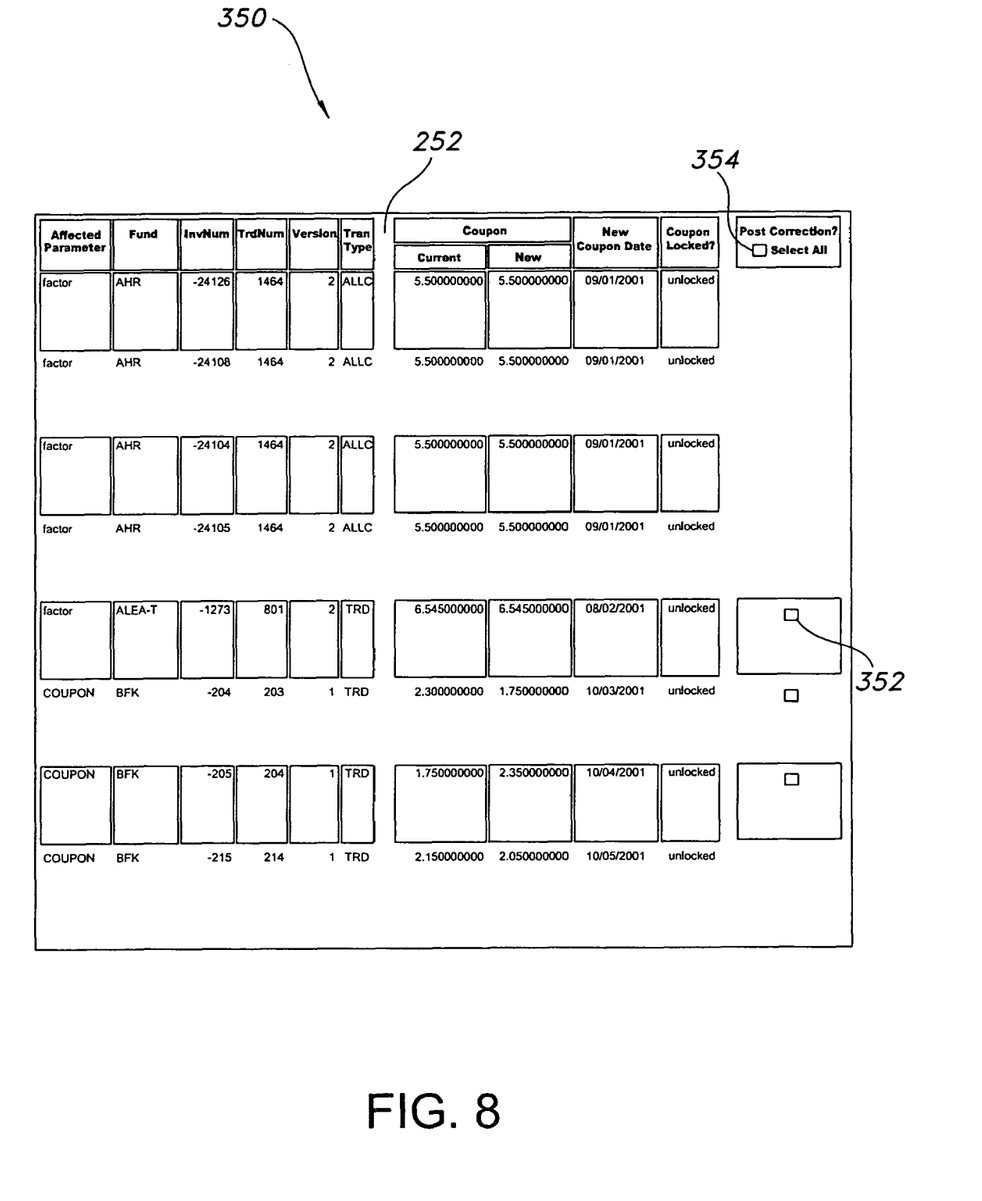
FIG. 8 illustrates another portion of the results table of FIG. 6, but not shown in FIG. 6, providing a tool primarily for confirming the results of a factor and/or coupon update.
Figure 9:
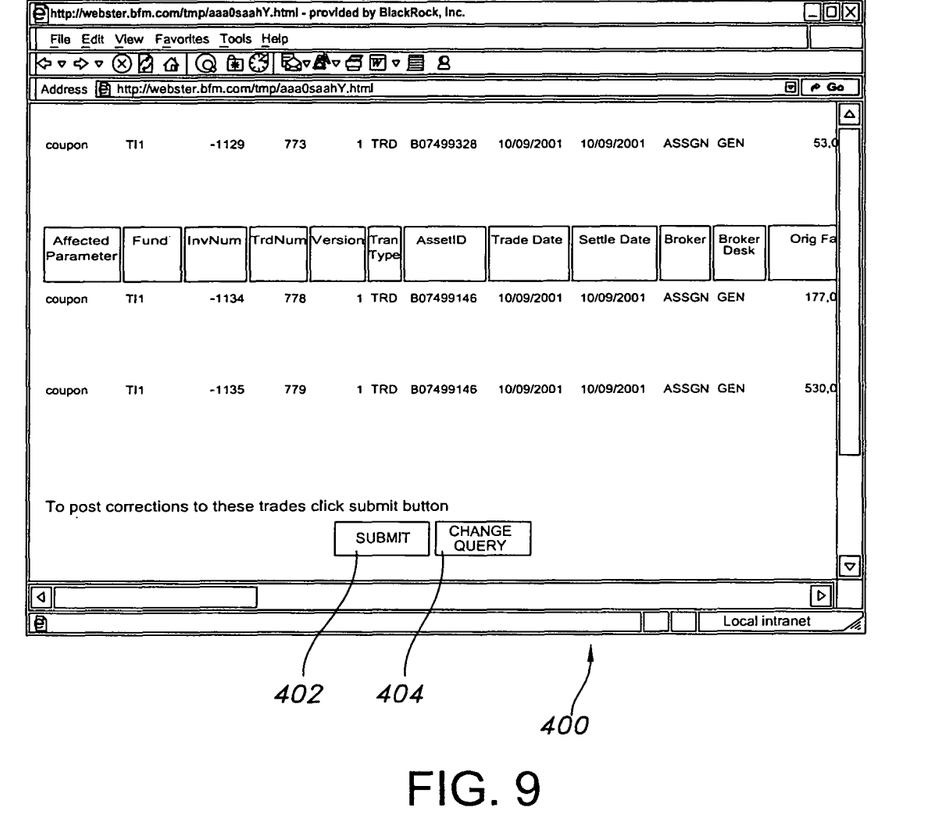
FIG. 9 illustrates another portion of the results table of FIG. 6, but not shown in FIG. 6, providing a tool primarily for storing the confirmed results or changing the search parameters.

FIGS. 7 through 9 illustrate screens depicting truncated portions of table 252 generated in accordance with the exemplary search. FIG. 7 illustrates a screen "clip" 300 including a field 302 for entering bank comments, some of which may have derived as a result of the search for factor and coupon updates. Screen 350 in FIG. 8 illustrates the right-hand portion of table 252. The "Post Correction?" checkboxes 352 in each row next to the trade listed in table 252 permits the user to specify whether or not the updated information and resulting computations should be stored in the trade and portfolio databases 24 and 26, respectively. The user may click on each box 352 to select each trade as desired or select all boxes 352 by clicking the "Select All" option 354 in the heading of the portion of table 252 shown in screen 350. FIG. 9 illustrates a screen 400 that illustrates the lower, left-hand portion of table 252. After the desired trades are selected for updating, either by selecting all trades in box 354 or one or more trades via individual checkboxes 352, the updated information will be stored in databases 24 and 26 by pressing submit button 402. The search parameters may be changed by pressing the change query button 404, which returns the user to screen 200.

Figure 10:
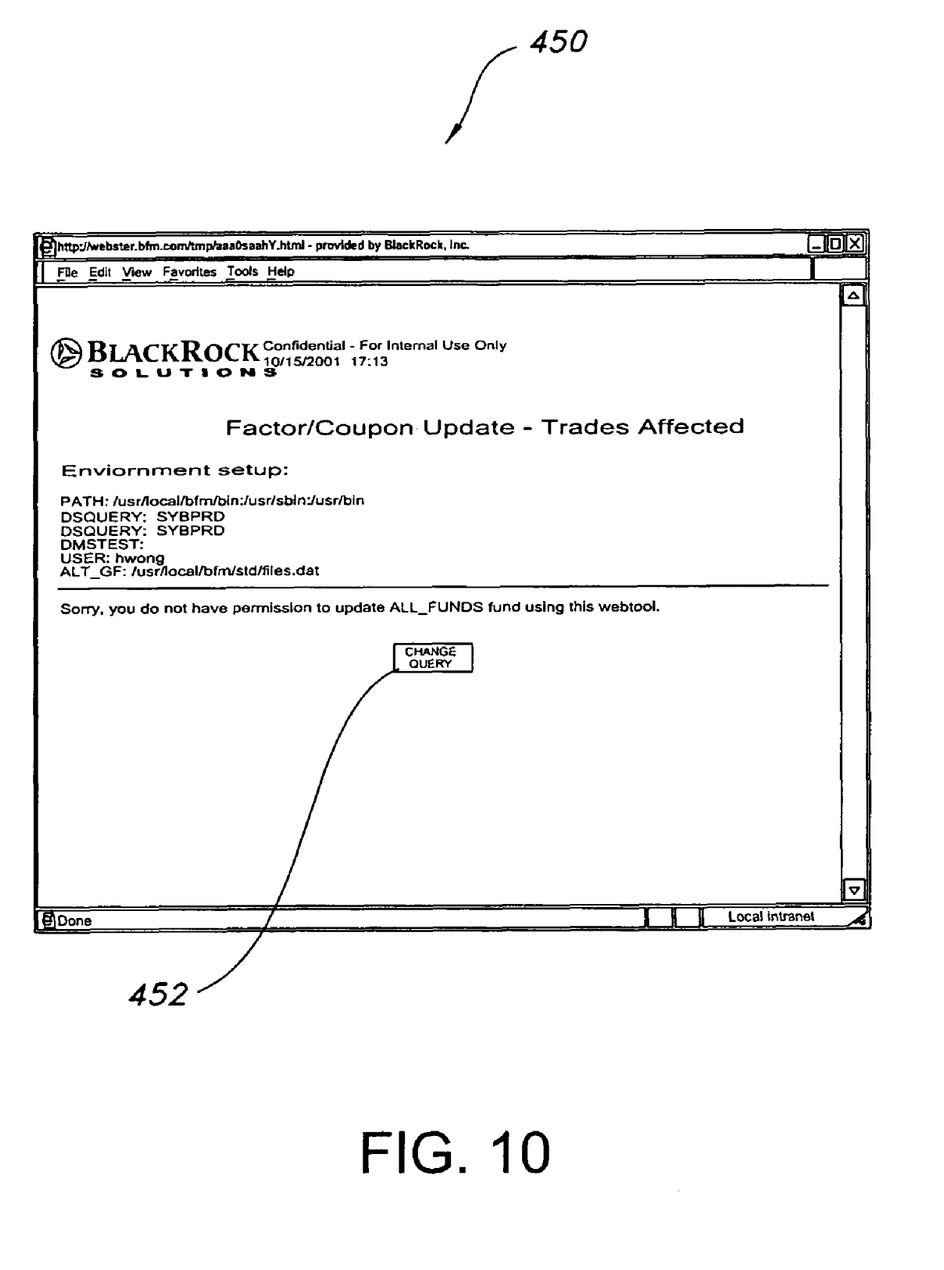
FIG. 10 illustrates an exemplary graphical user interface which indicates that the user lacks permission to access the records found by the search conducted in accordance with the present invention.

Preferably, restrictions are incorporated into system 10 to prevent unauthorized users from updating information. As shown in screen 350, trades in the top four rows of table 252, with "ALLC" in the "Tran Type" column, do not have checkboxes 352 in the "Post Correction?" column. In this way, these trades without boxes 352 are not available for updating and are safeguarded from being changed. These restrictions may be in place depending on the level of authority permitted to the particular user, or based on the type of transaction, such as for example, a trade involving a financial instrument having locked interest. The restriction on user access may also be portfolio group specific, in which case a screen such as screen 450 in FIG. 10 is provided to inform the user that permission is not granted to initiate the updated routine as he or she specified in screen 200. In the example shown in screen 450, the search of the "ALL_FUNDS" group was likely too broad in that it included portfolio groups for which the user is not permitted access. Thus, the user is provided with the opportunity to return to screen 200 and redo the search via the change query button 452.

Although exemplary and preferred aspects and embodiments of the present disclosure have been described with a full set of features, it is to be understood that the disclosed system and method may be practiced successfully without the incorporation of each of those features. It is to be further understood that modifications and variations may be utilized without departure from the spirit and scope of this inventive system and method, as those skilled in the art will readily understand. Such modifications and variations are considered to be within the purview and scope of the appended claims and their equivalents.

What is claimed is:

1. A method for updating a portfolio of pass-through securities, comprising the steps of:
   (a) searching a trade database for transactions involving pass-through securities using an analytical server computer;
   (b) searching a factor/coupon database for updated valuation data for the pass-through securities using the analytical server computer, the valuation data being time sensitive and including a remaining principal balance factor and a pass through coupon rate;
   (c) computing a present worth of the pass through securities, using the analytical server computer, based on the updated valuation data;
   (d) updating a portfolio containing the pass-through securities, using the analytical server computer, based on the computed present worth of the pass-through securities; and
   (e) storing the updated portfolio in a portfolio database.

2. The method according to claim 1, further comprising the step of displaying the transactions found on a graphical interface.

3. The method according to claim 2, further comprising the step of selecting which transactions to include when updating the portfolio.

4. The method according to claim 2, further comprising the step of obtaining user authorization prior to displaying the transactions found on the graphical interface.

5. The method according to claim 1, wherein the step of searching a trade database for transactions involving pass-through securities further includes searching for transactions based on settlement date.

6. The method according to claim 1, wherein the step of searching a trade database for transactions involving pass-through securities further comprises selecting one or more portfolios and searching only for transactions that affect the selected one or more portfolios.

7. A system for updating a financial outcome of transactions involving pass-through securities, the system comprising:
   (a) a trade database for storing data relating to transactions involving pass-through securities;
   (b) means for searching the trade database for transactions involving pass-through securities that require an update to time-sensitive valuation data; the valuation data including a remaining principal balance factor and a pass through coupon rate, the pass through securities having a computable present worth based on the time-sensitive valuation data;
   (c) means for updating the valuation data associated with pass-through securities found during the search of the trade database; and
   (d) means for computing the present worth of the pass-through securities based on the updated valuation data.

8. The system as recited in claim 7, further comprising a portfolio database for storing data relating to portfolios of investments including the pass-through securities.

9. The system as recited in claim 8, further comprising means for updating the portfolios in the portfolio database using the computed present worth of the pass-through securities.

10. The system as recited in claim 7, wherein the means for searching the trade database includes a search engine and graphical user interface permitting user-specification of search parameters.

11. The system as recited in claim 7, further comprising a valuation database for storing current valuation data.

12. The system as recited in claim 11, further comprising means for searching the valuation database for valuation data associated with the pass-through securities involved in the transactions found.

13. The system as recited in claim 7, further comprising a graphical user interface for displaying the transactions found.

14. The system as recited in claim 9, further comprising means for selecting which transactions to include when updating the valuation data.

15. The system as recited in claim 14, further comprising means for restricting unauthorized users from selecting which transactions to apply.

* * * * *